(12) United States Patent
Wolff et al.

(10) Patent No.: US 8,733,151 B2
(45) Date of Patent: May 27, 2014

(54) CONTACTLESS LEAK TEST USING PULSES

(75) Inventors: Michael Wolff, Schwarzenbek (DE);
Oliver Nuding, Hamburg (DE);
Heinrich Wiemer, Hamburg (DE)

(73) Assignee: KHS GmbH, Dortmund (DE)

( * ) Notice: Subject to any disclaimer, the term of this patent is extended or adjusted under 35 U.S.C. 154(b) by 488 days.

(21) Appl. No.: 13/119,457

(22) PCT Filed: Oct. 8, 2009

(86) PCT No.: PCT/EP2009/007208
§ 371 (c)(1),
(2), (4) Date: Mar. 17, 2011

(87) PCT Pub. No.: WO2010/046033
PCT Pub. Date: Apr. 29, 2010

(65) Prior Publication Data
US 2011/0185792 A1    Aug. 4, 2011

(30) Foreign Application Priority Data
Oct. 22, 2008 (DE) .......................... 10 2008 052 634

(51) Int. Cl.
*G01M 3/34* (2006.01)

(52) U.S. Cl.
USPC .......................................................... 73/45.4

(58) Field of Classification Search
USPC ................................................ 73/45.4, 49.3
See application file for complete search history.

(56) References Cited

U.S. PATENT DOCUMENTS

| | | | | |
|---|---|---|---|---|
| 4,884,696 | A | * | 12/1989 | Peleg ............................. 209/545 |
| 4,907,443 | A | * | 3/1990 | Pailler ................................ 73/52 |
| 5,372,030 | A | * | 12/1994 | Prussia et al. ..................... 73/37 |
| 5,566,569 | A | * | 10/1996 | Achter et al. ..................... 73/37 |

FOREIGN PATENT DOCUMENTS

| | | |
|---|---|---|
| DE | 3936163 | 5/1991 |
| DE | 4136472 | 5/1993 |
| DE | 4214958 | 11/1993 |
| DE | 4400179 | 7/1995 |

(Continued)

*Primary Examiner* — Hezron E Williams
*Assistant Examiner* — Mark A Shabman
(74) *Attorney, Agent, or Firm* — Occhiuti & Rohlicek LLP

(57) ABSTRACT

The invention relates to a leak test for filled and closed plastic bottles (5), wherein the plastic bottles (5) are led past a testing device (9) in a positionally stable manner, wherein the testing device (9) comprises an (optoelectric) detection system (10) and a pressure medium system (11), wherein the detection system (10) and at least one controllable valve (17) of the pressure medium system (11) are connected to an evaluation and control unit (15), wherein at least one or more pressure medium pulses having variable durations or a duration of 1 ms to 6 ms are generated when the plastic bottle (5) is led past a nozzle (16) of the pressure medium system (11), wherein each pressure medium pulse applies a punctiform load on a bottle wall region (18), wherein at least one light source (12, 13) or a laser beam of a laser distance sensor (23) of the detection system (10) illuminates or irradiates at least the bottle wall region (18) loaded by the pressure medium pulse at the same time as the pressure medium pulse is generated, wherein a camera (14) or the laser distance sensor (23) of the detection system (10) receives data of the bottle wall region (18) loaded with the pressure medium pulse and transmits the data to the evaluation and control unit (15). The invention provides for contactless pressure control of filled and closed plastic bottles (5), having a reduced pressure medium consumption and producing less noise.

12 Claims, 6 Drawing Sheets

(56) References Cited

FOREIGN PATENT DOCUMENTS

Figure 1:
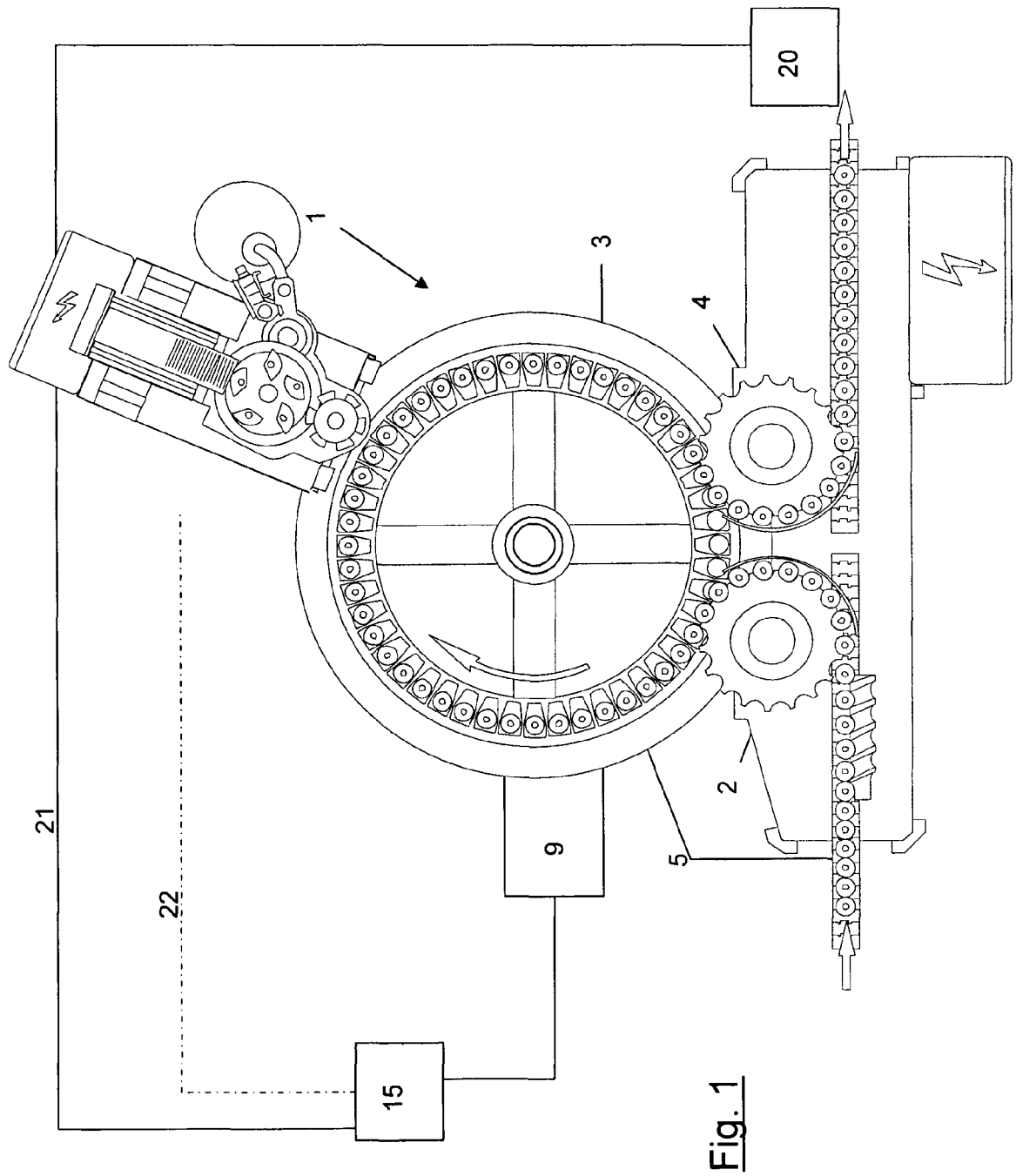

| DE | 19531754 | 4/1996 |
| DE | 19703528 | 8/1998 |
| DE | 19959198 | 6/2001 |
| DE | 102006054290 | 5/2007 |
| EP | 0310526 | 4/1989 |
| EP | 0540853 | 5/1993 |
| EP | 0593726 | 4/1994 |
| WO | 93/23180 | 11/1993 |

* cited by examiner

CONTACTLESS LEAK TEST USING PULSES

CROSS-REFERENCE TO RELATED APPLICATIONS

This application is the National Stage of International application No. PCT/EP2009/007208, filed on Oct. 8, 2009, which claims the priority of German Patent application No. 10 2008 052 634.7, filed on Oct. 22, 2008. The contents of both applications are hereby incorporated by reference in their entirety.

The invention concerns a leak test, in particular a contactless pressure control of filled and closed plastic bottles.

In the beverage industry, for example, it is known for containers, such as for example plastic bottles, in particular filled and closed plastic bottles, to be checked for leaks, and leaking containers to be sorted out. This is because carbon dioxide, for example, can escape from leaking plastic bottles. An escape of carbon dioxide can for example result in a drink becoming flat. But it is also possible that foreign matter could get into the container, or into the plastic bottle, so that the bulk product can even be spoiled. It is possible that, for example, a closure of the plastic bottle does not properly seal it, or that tiny hairline cracks or other damage or weaknesses are present in the container wall, which have not been detected by inspection devices.

DE 10 2006 054 290 A1 concerns itself with a leak test for plastic bottles. To perform the leak test, the container is compressed mechanically by a pair of compression elements. The disadvantage of the method disclosed in DE 10 2006 054 290 A1 is the fact that such a leak test cannot be integrated into a continuous process, since the respective plastic bottle has to be taken out of the bottle flow for each leak test, or the bottle flow even has to be interrupted.

DE 39 36 163 A1, however, proposes a contactless leak test of hermetically-sealed containers. The hermetically-sealed containers are transferred into a test chamber, where they are subjected to a test pressure. This is intended to solve the problem of checking a plurality of containers with widely differing configurations and different contents at high test rates. However, to do so, the container flow still has to be interfered with or even interrupted.

DE 42 14 958 A1 concerns a continuously-operating inspection machine for e.g. plastic bottles, which subjects the plastic bottle to a leak test. However, the plastic bottles are neither filled nor sealed. Instead, sterile air is introduced into the plastic bottle. The interior filled with sterile air is then put under pressure. Any drop in pressure indicates a defective plastic bottle.

In DE 41 36 472 A1 it is proposed that filled and closed bottles are continuously conveyed through a liquid bath. In the water bath, the liquid in the bottle is vibrated, so that carbon dioxide in particular bubbles out. If the closure of the bottle leaks, this will result in a certain quantity of the beverage escaping, as a result of which the fill level of the bottle is reduced. This is intended to be detected by a subsequent fill level check, so that the respective bottle can be sorted out.

DE 195 31 754 A1 concerns a pressure control of moving containers. A fluid, e.g. air, is directed at the container, causing a deformation of the container. If this deformation exceeds a certain threshold value, it is indicated that the container is not under pressure, i.e. is not properly sealed. This system is especially suitable for thin-walled aluminium cans. In order to ensure that the container is not displaced when the pressure is applied by the fluid, a second fluid jet is generated directly opposite the first fluid jet. However, this also gives rise to deformations due to the second fluid jet. To determine whether the container or the thin-walled aluminium can is sufficiently sealed, a complicated measurement structure is installed, which sets both deformations in relation to each other, in order thus to decide whether the container is sufficiently sealed or unusable. For example, sensors have to be installed in order to detect the deformations.

The invention is therefore based on the problem of improving a leak test for plastic bottles, and a contactless pressure control of the type mentioned above, using simple means, in such a way that this reliably detects a leaking or unusable plastic bottle without disturbing or interrupting the continuous bottle flow, while consuming less pressure medium and producing less noise.

According to the invention, the problem is solved by a leak test for plastic bottles with the features of claim 1, whereby the plastic bottles are led past a testing device held in a positionally stable manner, wherein the testing device comprises an optoelectric detection system and a pressure medium system, wherein the detection system and at least one controllable valve of the pressure medium system are connected to an evaluation and control unit, wherein at least one or more pressure medium pulses having variable durations of, for example, 1 ms to 6 ms are generated when the plastic bottle is led past a nozzle of the pressure medium system, wherein the at least one or each pressure medium pulse applies a punctiform load on a bottle wall region, wherein at least one light source of the detection system illuminates at least the bottle wall region loaded by the pressure medium pulse at the same time as the pressure medium pulse is generated, wherein the detection system or a camera thereof receives data of the bottle wall region loaded with the pressure medium pulse and transmits the data to the evaluation and control unit. The problem is also solved by a leak test of plastic bottles with the features of claim 13 and with a testing device with the features of claim 15.

Advantageously, the detection system and/or the camera can detect the presence of an indentation in the bottle wall region concerned caused by the pressure medium pulse, at which point the evaluation unit determines the actual form of the indentation, e.g. its depth and/or its diameter. A reference image or reference data for the respective bottle type (e.g. material, size, filling amount) and for the bulk product with which it is filled is stored in the evaluation and control unit and as a result thereof, a still-permissible form of the indentation. In the evaluation and control unit, the reference image or reference data is compared with the form of the actual indentation. This can obviously also be carried out using a computer, connected either to the evaluation and control unit or only to a control unit. If the detected actual form of the indentation exceeds a predetermined value, the evaluation and control unit generates a signal to sort out the respective plastic bottle.

In one advantageous embodiment, the plastic bottle consists of a thin-walled plastic, e.g. of PET, PEN or PE, without said materials being intended to be limitative. The plastic bottle can be a reusable or a disposable bottle.

In advantageous fashion, the nozzle of the pressure medium system is at a distance of less than 15 mm, preferably a distance of 5 to 6 mm from the respective bottle wall region. This is advantageous, as the pressure medium jet which is generated only has to cross a relatively short distance, which has an advantageous effect on its punctiform orientation and results in low or even no pressure energy losses.

In a preferred embodiment, the nozzle has a nozzle opening with a preferred opening amount of less than 5 mm, preferably of 2 mm (clear diameter), so this likewise effects an especially punctiform concentration of the pressure medium jet. Naturally, the opening amount is only intended to be mentioned by way of example. A nozzle with an adjustable nozzle, for example, is also possible.

In order to achieve an observation position for the camera with the least amount of interference, the camera is advantageously arranged above the nozzle, and directed at a slanted angle from above onto the respective bottle wall region. Obviously, the camera can also be directed at a slanted angle from below onto the respective bottle wall region. In order to achieve as perpendicular as possible an effect of the pressure medium and also a perpendicularly oriented detection system, the detection system and the nozzle can be oriented almost parallel to the object or to the plastic bottle. Obviously the precise angle can vary as a function of the optimal material properties of the bottle wall.

In one preferred embodiment, the detection system has two light sources, one of which is arranged above the camera and the other light source under the camera, but above the nozzle. With this advantageous embodiment, there ensues an especially good illumination of the respective bottle wall region. Naturally, both light sources are connected to the evaluation and control unit, so that both light sources can be controlled simultaneously to the generation of the pressure medium jet. Obviously it lies within the concept of the invention also to control the two light sources at different times, in order to capture a corresponding shadow formation of the indentation by means of the camera, which has an advantageous effect on an even more reliable evaluation of the data recorded on the indentation.

In one preferred embodiment, the pressure medium used is a gas, for example compressed air or a pressurised inert gas.

The testing device is, in a preferred embodiment, assigned to a labelling machine, whereby the testing device is arranged in such a way that the not-yet-labelled, but filled and closed, plastic bottle undergoes a contactless leak test. Obviously, labelled bottles can also be given a contactless leak test using the invention, which is especially advantageous if unlabelled bottles cannot be tested. Alternatively, the testing device can be arranged free-standing on a conveyor, e.g. on a conveyor belt, in which case the evaluation takes place in similar fashion.

Since the plastic bottles to be tested sometimes have a high intrinsic speed, and so as not to interfere with the bottle flow, it is advantageous within the sense of the invention if the valve is designed as a high-performance quick closure valve. This can be opened and closed in especially appropriate fashion on the plastic bottles running past the testing device or the nozzle relatively quickly, so that each plastic bottle can be tested contactlessly for an adequate seal. An inspection of each plastic bottle is necessary, especially in the foodstuffs sector, in particular when liquids suitable for consumption are involved, since a random sampling examination is not sufficient.

Also, with respect to the positionally stable transport, the labelling machine is especially advantageous, since this has a rotary table and packing tulips anyway, so the plastic bottle is guided very precisely. In this respect, it has been found advantageous to secure the plastic bottle on the base side, standing upright on the rotary table, and on the closure side by means of the packing tulip, against any displacement or even upset due to the force generated by the pressure medium pulse. Obviously, provision can be made so that the plastic bottle does not twist when the pressure medium jet is generated and acts on the respective bottle wall section.

The pressure medium jet can in a preferred embodiment be directed at a labelling area of the plastic bottle. It is, however, also possible that a bottle wall region which is briefly acted on by the pressure medium jet is a shoulder of the plastic bottle and/or another cylindrical region, which should be free of structure, of the plastic bottle, without limiting the respective bottle wall area to those mentioned by way of example.

Advantageously a contactless leak test and/or a contactless pressure control of plastic bottles is made available by the invention, whereby a continuous leak test at a medium pressure of more than 0.5 bar with a pressure medium pulse can be conducted, preferably in a labelling machine. The pressure medium pulse is only generated once there is a plastic bottle in front of the nozzle. Because the generation and retention of one or more pressure medium pulse jets per plastic bottle lasts only a very short time, the result is a reduced-noise contactless pressure control. Measurements have shown that a loudness of less than 80 db or to be precise, 74 db, is present when the very brief pressure medium pulse jet is generated. The very brief pressure medium pulse jet also results in low pressure medium consumption. The measurement unit and/or camera and/or evaluation unit which pick up data can recognise whether the respective plastic bottle has an indentation caused by the pressure medium pulse jet, while at the same time determining the form of the indentation. The evaluation unit generates a signal, if required, to sort out the respective plastic bottle. The respective plastic bottle can be sorted out after labelling, or the labelling units are controlled, for example, via the evaluation and control unit so that the respective plastic bottle is not labelled. It has been found, surprisingly, that by means of the very brief pressure medium pulse and the precise, punctiform loading of the defined bottle wall region, disrupting vibrations in the respective bottle wall region and/or in the rest of the bottle wall and a disruptive degassing, which counteracts the formation of an indentation and poses an obstacle to detection of same, can be circumvented.

In a refinement of the contactless leak test, provision is advantageously made that the plastic bottles are guided past a testing device while held in a positionally stable manner, the testing device having an optoelectric detection system and a pressure medium system, while the detection system and at least one controllable valve of the pressure medium system are connected to an evaluation and control unit, whereby a pressure medium pulse lasting from 1 ms to 6 ms is generated when the plastic bottle is guided past a nozzle of the pressure medium system, whereby the pressure medium pulse applies a punctiform load to a bottle wall region, whereby at least one laser light source of the detection system illuminates or irradiates at least the bottle wall region loaded by the pressure medium pulse at the same time as the pressure medium pulse is generated, wherein a laser distance sensor or another suitable measurement system of the detection system receives data of the bottle wall region loaded with the pressure medium pulse and transmits the data to the evaluation and control unit.

Advantageously, the laser distance sensor can detect the presence of an indentation caused by the pressure medium pulse in the respective bottle wall region, whereby the evaluation unit determines the actual form of the indentation, e.g. its depth and/or diameter. In the evaluation and control unit is stored reference data on the respective bottle type (e.g. material, size, filling amount) and on the bulk product with which it is filled and as a result thereof, a still-permissible form of the indentation. In the evaluation and control unit, the reference data is compared with the form of the actual indentation. This can naturally also be carried out in a computer which is connected either to the evaluation and control unit or just to a control unit. If the detected actual form of the indentation exceeds a predetermined value, the evaluation and control unit generates a signal to sort out the respective plastic bottle. More details of an evaluation of this kind are given further on.

In an advantageous embodiment, the plastic bottle is also made from a thin-walled plastic, e.g. from PET, PEN or PE, without said materials being intended to be limitative. The plastic bottle can be a reusable or a disposable bottle.

In advantageous fashion, the nozzle of the pressure medium system is, as before, at a distance of less than 15 mm, preferably a distance of 5 to 6 mm, from the respective bottle wall region. This is advantageous, as the pressure medium jet which is generated only has to cross a relatively short distance, which has an advantageous effect on its punctiform orientation and results in low or even no pressure energy losses.

In order to achieve an observation position for the laser distance sensor with the least amount of interference, the nozzle is advantageously arranged above or beneath the sensor, and preferably directed at a slanted angle from above or below onto the respective bottle wall region, whereby this preferred arrangement should be selected if advantages can thereby be achieved in relation to an exactly perpendicular orientation. Obviously, the nozzle or nozzles can also be directed at a slanted angle from right and/or left onto the respective bottle wall region. Naturally it is also possible to arrange the nozzle or nozzles next to the laser distance sensor.

A laser distance sensor instead of a camera can therefore also advantageously be used. In a preferred embodiment, the laser distance sensor is arranged so that it stands with a perpendicular axis parallel to the central axis of the bottle. The bottle is thereby guided past the laser distance sensor, whereby the indentation caused by the compressed air is recorded as a distance. In advantageous fashion, a sensor measurement head can be arranged vertically at various angles. In a preferred embodiment, an angle of 8.5° may be provided, without limiting the angular amount to the value mentioned by way of example. With the exemplary angular position of 8.5°, the laser beam emitted by the laser distance sensor is inclined from the vertical by plus or minus 8.5°, whereby the angle of inclination is not specified as definitive, and can vary according to the type of sensor head.

In a preferred embodiment, the pressure medium used, as before, is a gas, for example compressed air or a pressurised inert gas.

The testing device is also, in this preferred embodiment, assigned to a labelling machine, whereby the testing device is arranged so that the not-yet-labelled, but filled and closed plastic bottle undergoes a contactless leak test. Obviously labelled bottles can also undergo a contactless leak test with the invention, which is especially advantageous when unlabelled bottles cannot be tested. The testing device can, however, also be assigned to a conveyor, e.g. a conveyor belt.

Since the plastic bottle sometimes has a high intrinsic speed, and again, so as not to interfere with the bottle flow, it is advantageous within the sense of the invention, if the valve is designed as a high-performance quick closure valve. This can be opened and closed in especially appropriate fashion on the plastic bottles running past the testing device or the nozzle relatively quickly, so that each plastic bottle can be tested contactlessly for an adequate seal. An inspection of each plastic bottle is necessary, especially in the foodstuffs sector, in particular when liquids suitable for consumption are involved, since a random sampling examination is not sufficient.

Also, with respect to the positionally stable transport, the labelling machine is, as already described, especially advantageous, since this has a rotary table and packing tulips anyway, so the plastic bottle is guided very precisely. In this respect, it has been found advantageous to secure the plastic bottle on the base side, standing upright on the rotary table, and on the closure side by means of the packing tulip, against any displacement or even upset due to the force generated by the pressure medium pulse. Obviously, provision can be made so that the plastic bottle does not twist when the pressure medium jet is generated and acts on the respective bottle wall section.

The pressure medium jet can likewise in a preferred embodiment be directed at a labelling area of the plastic bottle. It is, however, also possible that a bottle wall region which is briefly acted on by the pressure medium jet is a shoulder of the plastic bottle and/or another cylindrical region, which should be free of structure, of the plastic bottle, without limiting the respective bottle wall area to those mentioned by way of example.

Advantageously, a contactless leak test and/or a contactless pressure control of plastic bottles is made available by the refinement of the invention by means of the laser distance sensor, whereby a continuous leak test at a medium pressure of more than 0.5 bar with a pressure medium pulse can take place, preferably in a labelling machine. The pressure medium pulse is only generated once there is a plastic bottle in front of the nozzle. Because of the very brief generation and duration of the single pressure medium pulse jet per plastic bottle, the result is a reduced-noise contactless pressure control. Measurements have shown that a loudness of less than 80 db or to be precise, 74 db, is present when the very brief pressure medium pulse jet is generated. The very brief pressure medium pulse jet also results in low pressure medium consumption. The laser distance sensor recognises whether the respective plastic bottle has a dent or an indentation caused by the pressure medium pulse jet, while at the same time determining the type of indentation, thus whether this is still tolerable or not. The evaluation unit generates a signal, if required, to sort out the respective plastic bottle. The respective plastic bottle can be sorted out after labelling, or the labelling units are controlled, for example, via the evaluation and control unit so that the respective plastic bottle is not labelled. It has been found, surprisingly, that by means of the very brief pressure medium pulse and the precise, punctiform loading of the defined bottle wall region, disrupting vibrations in the respective bottle wall region and/or in the rest of the bottle wall and a disruptive degassing, which counteracts the formation of an indentation and poses an obstacle to detection of same, can be circumvented.

[sic]

To determine the distance detected by the laser distance sensor, and/or to determine the tolerability of the indentation, or whether the container is leaking, thus the indentation is no longer tolerable, it is now possible to proceed in two stages, namely with a measured value preparation and with an actual evaluation.

For the preparation of measured values, provision can be made to correct a measured curve for measurement errors of the laser distance sensor. Provision may also be made to smooth the measured curve, or to conduct a low pass filtering of the curve. Obviously said measures can be used individually or sequentially in combination (also repeatedly), in order to carry out the preparation of measured values.

The evaluation may be carried out, for example, as follows:

Firstly, target curves are compared with each other. This means that pre-calculated curves, or alternatively, measurement curves recorded without blowing for an object moving past (i.e. the exemplary bottle) at various speeds are taken into account as reference curves. This is based on the finding that measured curves vary according to speed. As many curves may be taken into account as desired, but preferably at least one, as reference curve. As second measured curve, the blown object is recorded which is moving past the laser distance sensor. Both curves, i.e. that of the blown object and that of the unblown object are displaced in their X-axis, i.e. in their position. This displacement requires correction. One possibility here is a fixed offset, a superposition by means of a correlation, or the concrete determination of the position of features of the curves, such as for example an average highest point as centre.

As a result of different object distances from the laser measurement sensor and/or the laser distance sensor and different object sizes, the curves, i.e. that of the blown object and that of the stored reference object and/or that of the unblown object, vary in their distance from the sensor. This causes a Y-offset, which must be corrected. After that, there arises in the measurement window a differential between the curves, which originates almost exclusively from the blowing. In order to carry out a correction in the Y-axis, a superposition by means of a correlation can be conducted, or an average of an offset window can be carried out for both curves. The differential corresponds to the necessary height correction. Optimally, this offset window lies as close as possible to the indentation. For evaluation purposes, the average of a measured curve within a measurement window can be calculated, the differential of these average values being tolerated with a threshold value. It is also possible to calculate the area between the two curves within a measurement window, which is tolerated with a threshold value.

It is also possible to measure using a reference value. To do so, shortly before the passing object is indented by means of the medium, an average value is measured close to the indentation within a reference window. As a result of this value, the accurately reproducible position of the object with respect to the laser distance sensor and the form (diameter) of the object can be neglected. For evaluation purposes, an average value within a measurement window can be calculated. The distance of this value from the reference average is tolerated with a threshold value. The reference average can, however, also be expanded by a superposed imaginary horizontal line. Then the area of this curve with respect to the corrected measured curve can be calculated and tolerated with a threshold value.

Further advantageous embodiments of the invention are disclosed in the sub claims and the following description of the figures, which show:

FIG. 1 an exemplary labelling machine with a testing device, and

Figure 2:
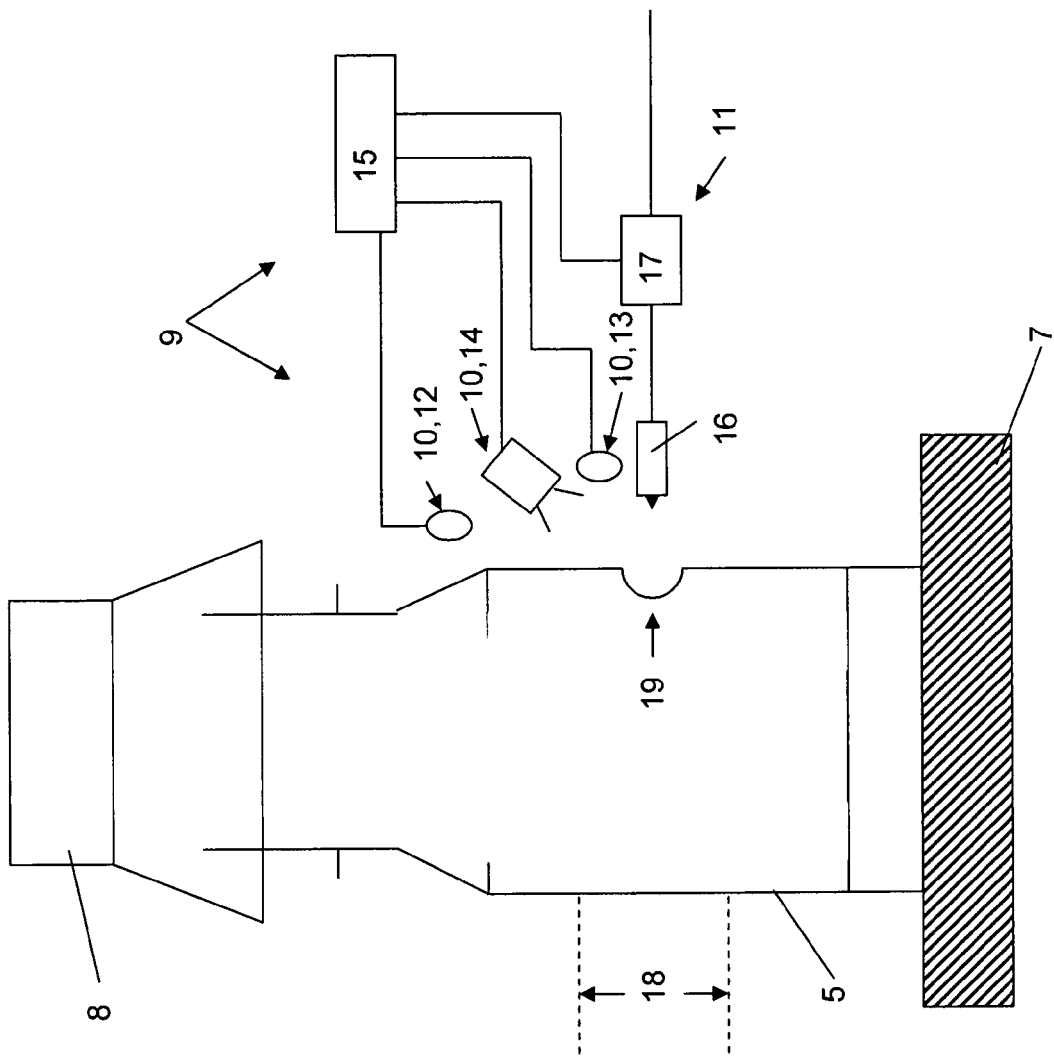
Figure 3:
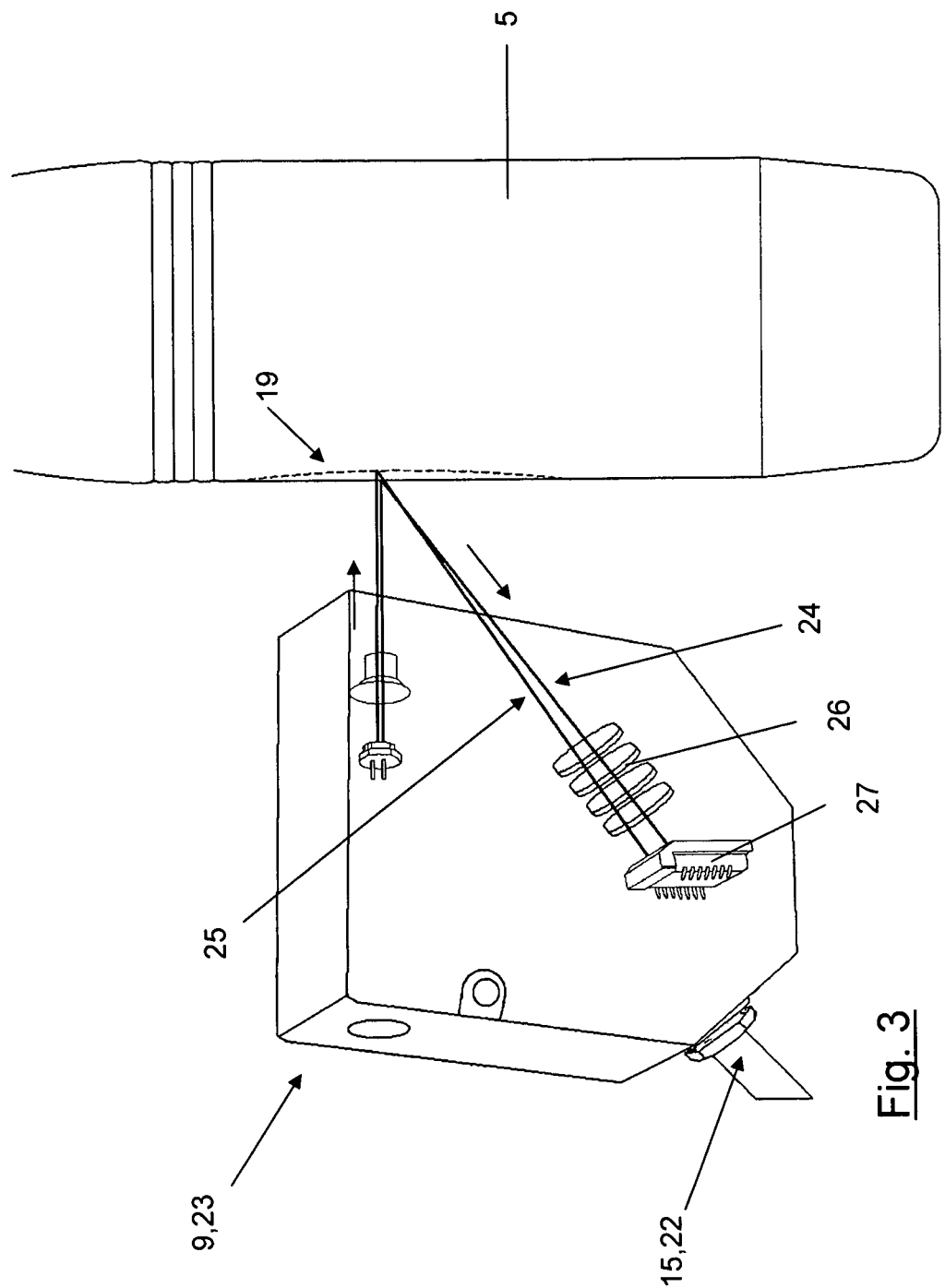

FIG. 2 the testing device in outline view,

FIG. 3 a testing device with a laser distance sensor, and

Figure 4:
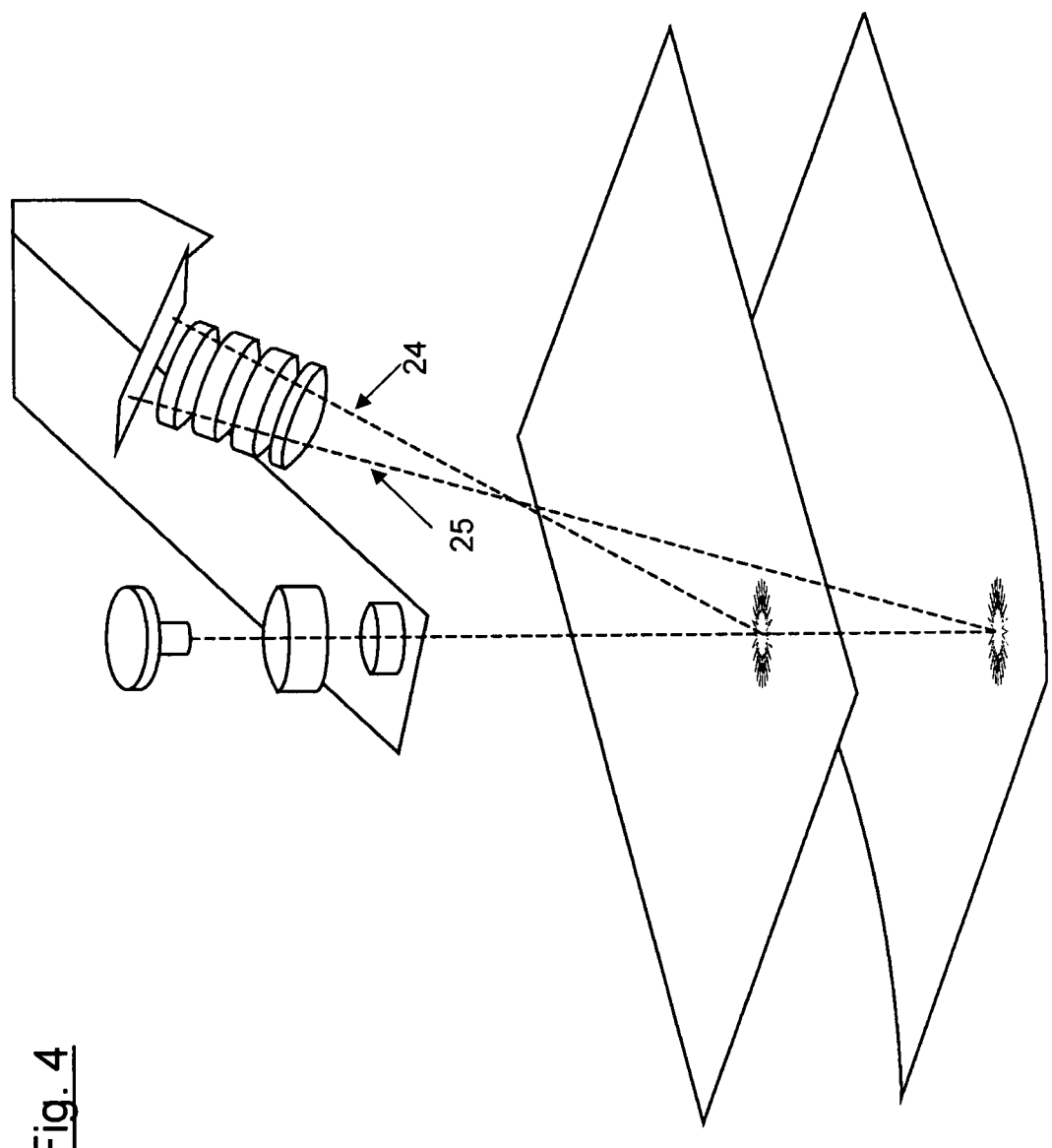
Figure 5:
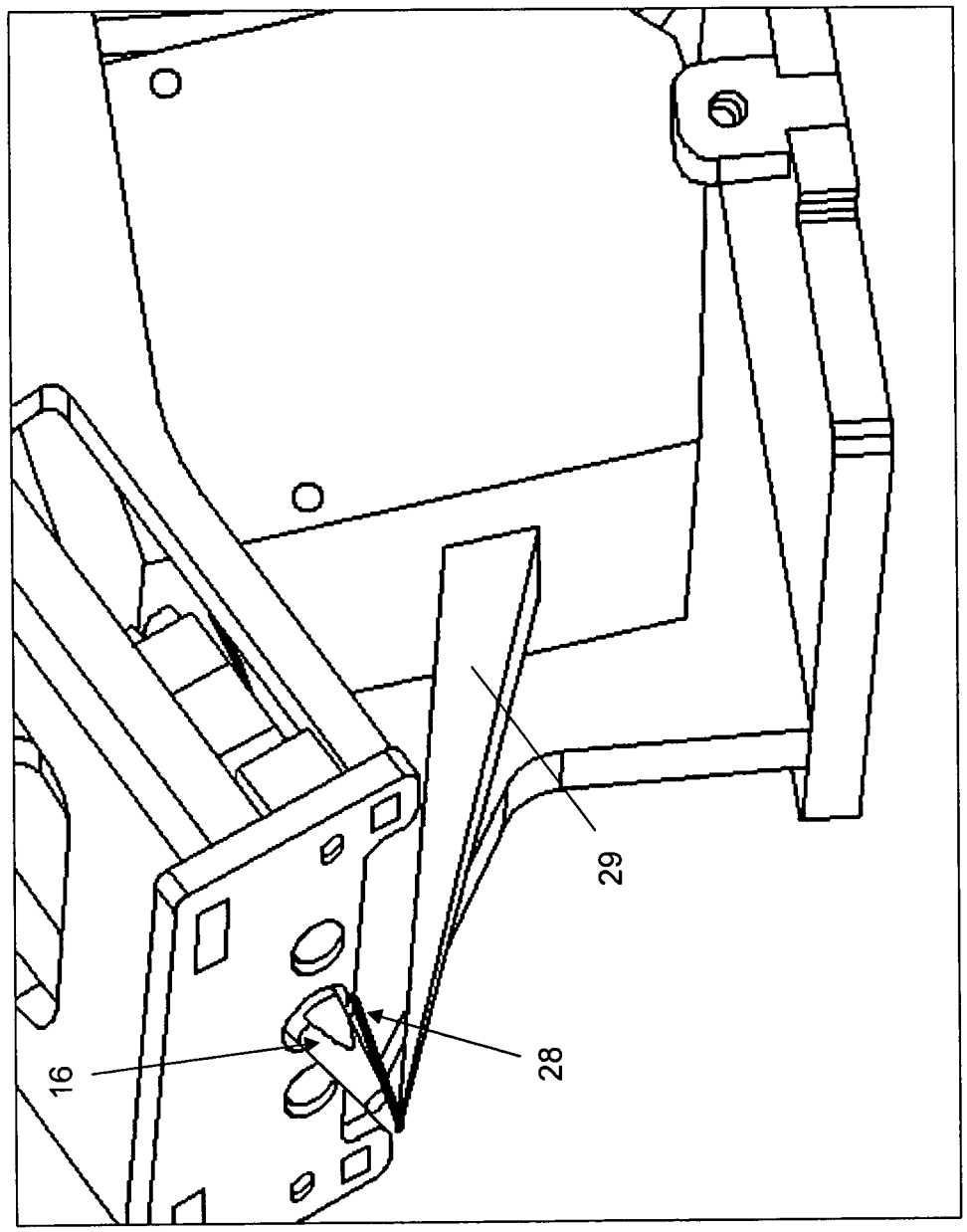

FIG. 4 a laser triangulation as detailed view,

FIG. 5 a beam path of a laser beam, and

Figure 6:
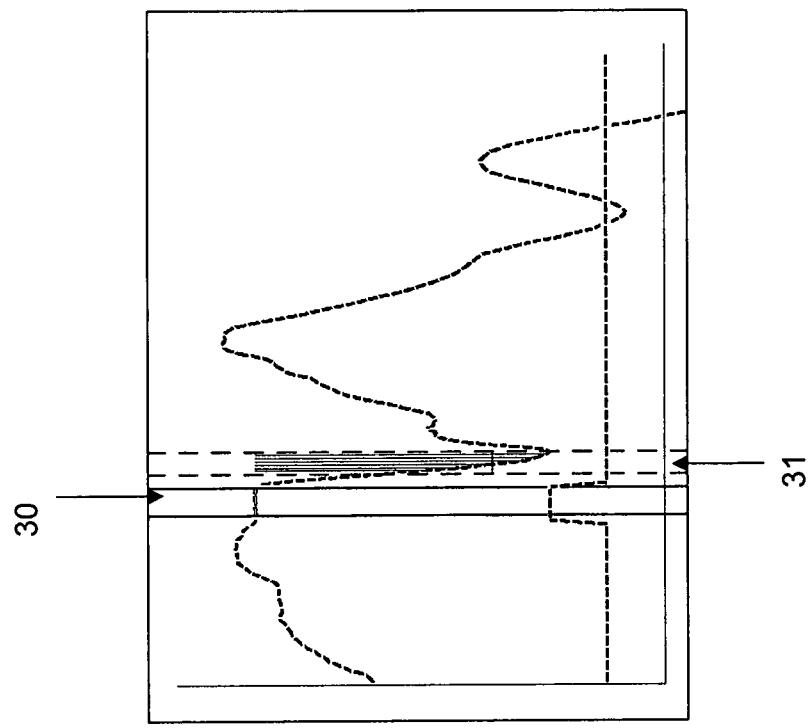
Figure 6:
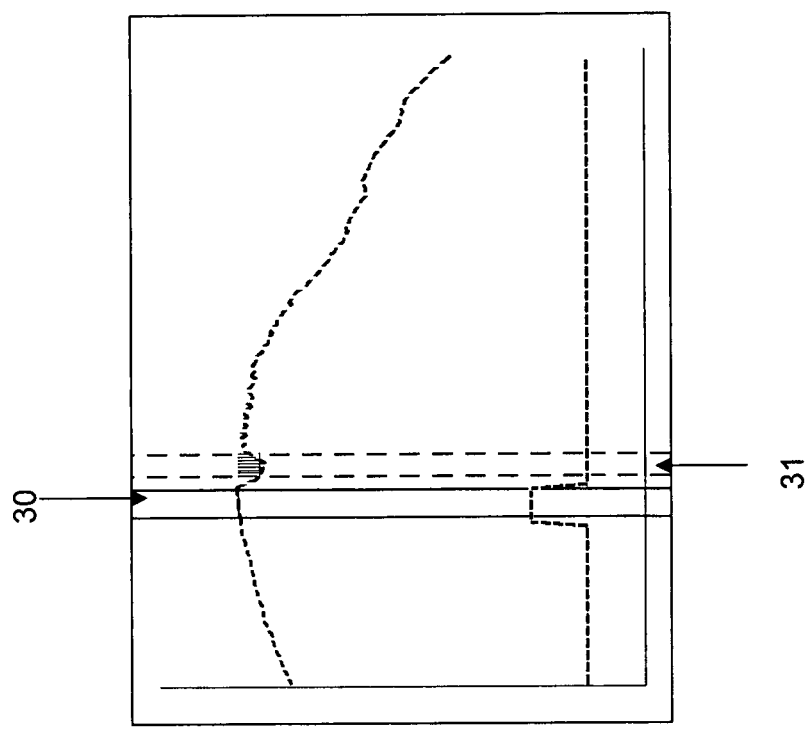

FIG. 6 scaled measured curves.

FIG. 1 shows a labelling machine 1. The labelling machine 1 has an inlet star 2, a labelling carousel 3 and an outlet star 4. Filled and closed plastic bottles 5 are fed to the labelling machine 1 in known fashion and, once labelled, guided out of it. A labelling unit 6 is arranged by way of example on the labelling machine 1. The plastic bottles 5 are, at least in the labelling carousel 3, exactly guided, i.e. standing upright on their bases on a rotary table 7 and held in a positionally stable manner at the closure side by a packing tulip 8 (FIG. 2)

By way of example, viewed in the direction of rotation of the labelling carousel 3, a testing device 9 is arranged before the labelling unit 6 for contactless pressure control of each individual, filled and closed plastic bottle 5 running past the testing device 9. Obviously, the testing device 9 can also be arranged on a conveyor, e.g. a bottle conveyor belt.

In FIG. 2, the testing device 9 is shown in detail. A closure of the plastic bottle 5 is not shown in FIG. 2.

The testing device 9 has an optoelectric detection system 10 and a pressure medium system 11. The optoelectric detection system 10 has, for example, two light sources 12 and 13 and a camera 14. The components of the optoelectric detection system 10 are each connected to an evaluation and control unit 15. The pressure medium system 11 has a nozzle 16, a controllable valve 17, in the preferred embodiment as a high-performance quick closure valve 17, and a pressure medium source, not shown. The valve 17 is connected to the evaluation and control unit 15.

If a plastic bottle 5 moves past the testing device 9, or if the plastic bottle 5 reaches the position of the nozzle 16, a brief pressure medium pulse (trigger for opening the valve 17) is generated, which is directed at a bottle wall region 18. The pressure medium pulse has a duration of less than 10 msec, in fact a duration of 5 to 6 msec, and has a pressure amount of, preferably, more than 0.5 bar. The pressure medium pulse applies a punctiform load to the bottle wall region 18 of the plastic bottle 5, and may in some cases generate an indentation 19, if the plastic bottle 5 is, for example, not tightly sealed.

Simultaneously with the triggering of the valve 17, i.e. with the generation of the brief pressure medium pulse, the two light sources 12 and 13 and the camera 14 are triggered. The light sources 12 and 13 illuminate the bottle wall region 18 in the form of a flash, so that the camera 14 can record corresponding data from the respective bottle wall region 18. The camera 14 sends this actual data, i.e. the form (e.g. depth, diameter) of the indentation 19 to the evaluation and control unit 15. The evaluation and control unit 15 stores reference data and/or reference images concerning the respective bottle type (size, material, form) with the bulk product respectively filled therein, and said data shows which types and/or forms of indentation are still tolerable. The actual data is compared with the reference data. If an intolerable deviation turns out to be in the negative, i.e. if the indentation 19 is such that the internal pressure of the plastic bottle 5 does not sufficiently counteract the force of pressure generated by the pressure medium pulse, the evaluation and control unit 15 generates a signal to sort out the respective bottle, as this is obviously, for example, not tightly sealed.

The signal for sorting out can be transmitted directly from the evaluation and control unit 15 to a sorting device 20, which is arranged in the direction of flow of the plastic bottles 5 downstream of the labelling machine 1. This is represented in FIG. 1 by means of the solid line 21. It is, however, also possible for the evaluation and control unit 15 to be connected to the exemplary labelling unit 6 (dash-dot line 22), so that this receives a signal not to label the respective, leaking plastic bottle 5. In downstream inspection devices, which would inspect the plastic bottles for correct labelling, a signal could then be generated to sort out the respective, leaking, unlabelled plastic bottle 5.

In the exemplary embodiment in FIG. 2, the respective bottle wall region 18, which is loaded by the brief pressure medium pulse, is a labelling region of the plastic bottle 5. The plastic bottle 5 is, for example, a disposable bottle, which consists of a thin-walled plastic, e.g. PET, PEN or PE. The nozzle 16 has an opening with a clear diameter of, preferably, 2 mm, and is at a distance of less than 15 mm, preferably a distance of 5 to 6 mm, from the bottle wall region 18.

The camera 14 is arranged above the nozzle 16 in the drawing plane by way of example. The first light source 12 is arranged in the drawing plane above the camera 14, the second light source 13 being arranged under the camera 14 but, in the drawing plane, above the nozzle 16.

In variance from FIG. 2, FIG. 3 shows a testing device 9 with a laser distance sensor 23 as detection system 10. The laser distance sensor 23 is arranged with a perpendicular axis parallel to the axis of the plastic bottle 5. The plastic bottle 5 is guided past the laser distance sensor 23, whereby the indentation 19 generated by the compressed air (dotted) or dent 19 is recorded as a distance. This means that data from an unblown plastic bottle 5 is used as reference, which is referred to as the laser beam 24, and is compared with data from a blown plastic bottle 5, which is referred to as the laser beam 25. The laser beam 24 falls, for example, after passing a lens system 26, onto a certain point of a chip 27 and/or on a certain point of a sensor chip 27. The laser beam 25 falls on the chip 27 at a distance from that point, i.e. offset after passing the lens system 26. In this respect, both laser beams 24 and 25 falling on the chip 27 have a relative distance from each other, from which the tolerability of the indentation 19 or an intolerable indentation 19 can be concluded. This is also discernible in detail from the detailed view in FIG. 4. As an alternative to the recorded reference curve, the reference curve can be determined by computer.

The laser distance sensor 23 and/or its measurement head can be arranged vertically at various angles. For example, the laser distance sensor 23 and/or its measurement head can be arranged at an angle of 8.5°, which means that the laser beam emitted is inclined in the perpendicular by plus or minus 8.5° (depending on the installation position). This is based on the finding that the surfaces of, for example, PET bottles, are not perfectly smooth. There are inclusions and scratches, which modify reflection properties abruptly when scanned. When taking measurements, therefore, a total reflection of the laser should be avoided. At the same time, the diffuse reflection must not prove too weak. That is why it is preferable for the laser to be arranged at an angle of 8.5° to the plastic bottle. The nozzle aims at the point of impact of the laser. Naturally one nozzle 16 can be provided, whereby an arrangement of two nozzles 16 is also possible, which can also be arranged beside the laser distance sensor 23.

In FIG. 5 the emitted laser beam is designated as 28, while 29 designates the light being remitted to the sensor chip 27.

Obviously, as a variant from the installation position of the laser distance sensor 23 shown, an overhead arrangement according to FIG. 3 is possible.

FIG. 6 shows one way to determine whether an indentation is tolerable or not. FIG. 6 shows scaled measured curves. In FIG. 6 on the left, an indentation with correct internal pressure is shown, while in FIG. 6 on the right an indentation in a pressureless plastic bottle is shown. Firstly an average value within a reference window 30 is found. An area integral within a measurement window 31 specifies the deviation.

Not shown in the figures, but included in the scope of the invention, is an embodiment in which one or more nozzles, instead of being directed at the bottle wall region (18), are directed at a closure element of the container mouth and the pressure medium pulse applies a brief load to this closure element. This site of the effect can be provided alone, or redundant to the loading in the bottle wall region (18). The effect on the closure element, in particular a cover, a cap or a closure film, is frequently advantageous in terms of construction, if structural conditions are restricted. The operating and measurement principle is similar to the aforementioned process.

List of Reference Numbers
1 labelling machine
2 inlet star
3 labelling carousel
4 outlet star
5 plastic bottle
6 labelling unit
7 rotary table
8 packing tulip
9 testing device
10 detection system
11 pressure medium system
12 first light source
13 second light source
14 camera
15 evaluation and control unit
16 nozzle
17 valve
18 bottle wall region
19 indentation
20 sorting device
21 solid line
22 dash-dot line
23 laser distance sensor
24 laser beam
25 laser beam
26 lens system
27 sensor chip
28 laser beam
29 remitted light
30 reference window
31 measurement window

The invention claimed is:

1. An apparatus for processing filled and closed plastic bottles, said apparatus comprising a testing device for testing said filled and closed plastic bottles, held on a closure side in a positionally stable manner, for leakage, said testing device comprising: a pressure-medium system having a nozzle, a controllable valve, and a pressure-medium source, said pressure-medium system being configured to direct a pressure-medium pulse of variable duration of less than 10 ms and presenting a pressure of more than 0.5 bar toward a bottle, thereby applying a punctiform load thereto, wherein said nozzle has a clear diameter that is no more than 2 mm and is disposed to be no more than 6 mm from a bottle wall region of said bottle at which said punctiform load is to be applied; a detection system having one of a light source and a laser distance sensor for illuminating or irradiating a bottle wall region concurrently with said pressure-medium pulse, and a camera for receiving data representative of the bottle wall region loaded with said pressure-medium pulse; and an evaluation and control unit connected to said controllable valve, said camera, and said light source for receiving, from said camera, said data representative of a portion of the filled and closed plastic bottle to which the punctiform load has been applied.

2. The apparatus of claim 1, wherein said camera is arranged above said nozzle and oriented to view a point on a plastic bottle at which said punctiform load is to be applied.

3. The apparatus of claim 1, wherein said detection system comprises a first light source arranged above said camera and a second light source arranged below said camera and above said nozzle.

4. The apparatus of claim 1, wherein said pressure-medium source comprises a gas source.

5. The apparatus of claim 1, further comprising a labeling machine, said labeling machine being disposed to label said bottles.

6. The apparatus of claim 1, wherein said controllable valve comprises a high-performance quick closure valve.

7. The apparatus of claim 1, further comprising a rotary table and a packing tulip, wherein said packing tulip is configured to hold a plastic bottle at a base thereof and at a closure side thereof and to cause said bottle to stand upright on said rotary table.

8. The apparatus of claim 1, further comprising means for positioning said bottle relative to said nozzle to cause said punctiform load to be applied to a labeling region of said plastic bottle.

9. The apparatus of claim 1, wherein said nozzle is oriented to apply said punctiform load to a closure element of a container mouth of said filled and closed bottle.

10. The apparatus of claim 1, wherein said nozzle is directed to cause said pressure-medium pulse to load both a bottle wall region and a closure element of said container mouth.

11. The apparatus of claim 1, wherein said light source comprises a laser distance sensor.

12. The apparatus of claim 1, wherein said evaluation and control unit is programmed and configured to correct a measured curve for measurement errors of a laser distance sensor to prepare said measured value, to receiving a reference curve, said reference curve corresponding to an unblown object, to receive a measured curve, said measured curve corresponding to a blown object, to determine whether a measured value is within a differential between said reference curve and said measured curve, and based at least in part on said determination, to determine that said bottle has a tolerable indentation.

* * * * *